United States Patent [19]

Eckert

[11] Patent Number: 4,940,037
[45] Date of Patent: Jul. 10, 1990

[54] FUEL INJECTION SYSTEM FOR INTERNAL COMBUSTION ENGINES

[75] Inventor: Konrad Eckert, Stuttgart, Fed. Rep. of Germany

[73] Assignee: Robert Bosch GmbH, Stuttgart, Fed. Rep. of Germany

[21] Appl. No.: 347,887

[22] PCT Filed: Jun. 11, 1988

[86] PCT No.: PCT/DE88/00350

§ 371 Date: Mar. 6, 1989

§ 102(e) Date: Mar. 6, 1989

[87] PCT Pub. No.: WO89/00242

PCT Pub. Date: Jan. 12, 1989

[30] Foreign Application Priority Data

Jul. 6, 1987 [DE] Fed. Rep. of Germany ....... 3722264

[51] Int. Cl.$^5$ ............................................. F02M 39/00
[52] U.S. Cl. .................................... 123/506; 123/447; 123/496
[58] Field of Search ............... 123/506, 458, 447, 501, 123/500, 496, 449

[56] References Cited

U.S. PATENT DOCUMENTS

| | | | |
|---|---|---|---|
| 4,495,915 | 1/1985 | Shinoda | 123/458 |
| 4,563,992 | 1/1986 | Kobayashi | 123/458 |
| 4,574,756 | 3/1986 | Ito | 123/506 |
| 4,586,480 | 5/1986 | Kobayashi | 123/506 |
| 4,708,116 | 11/1987 | Gaa | 123/506 |
| 4,817,575 | 4/1989 | Hofer | 123/458 |
| 4,840,155 | 6/1989 | Karle | 123/506 |

FOREIGN PATENT DOCUMENTS 0032062 2/1989 Japan .................................. 123/506

Primary Examiner—Carl Stuart Miller
Attorney, Agent, or Firm—Michael J. Striker

[57] ABSTRACT

A fuel injection system for an internal combustion engine and a method of controlling fuel injection according to which a predetermined fuel quantity is delivered from a high-pressure pump to the internal combustion engine, first and second return flow quantity are returned through first and second relief ducts, the second relief duct including a control throttle having a constant cross-section, and an electronic control unit controls flow delivery in accordance with characteristic values including those of the internal combustion engine, the pump, and a quantity measuring device for measuring the second return flow, and in accordance with the predetermined fuel delivery quantity also used as a characteristic value.

14 Claims, 3 Drawing Sheets

FUEL INJECTION SYSTEM FOR INTERNAL COMBUSTION ENGINES

BACKGROUND OF THE INVENTION

The invention relates to a fuel injection system for internal combustion engines.

In a known fuel injection system of this type (DE-OS 29 42 010), a magnetic valve is arranged in the first relief duct as an open/close control device, and there is a control throttle in the second relief duct whose corss-section can be changed by a servomotor. The control throttle cooperates with an electronic control device in such a way that the servomotor is controlled by the electronic control device. While the start and end of delivery is determined by the magnetic valve which blocks the first relief duct or reopens it, they can also be effected in principle by other means, e.g. a mechanical open/close controlling means. The control of an additional flow-off quantity down to 0 quantity is effected by an adjustable throttle which enables a flow-off when the magnetic valve is closed and the injection takes place. This known system relates to a special modification of a process for achieving a quiet running of an engine by lengthening the injection period, this process being known in many different forms. During a partial quantity flow-off during the injection process, this flow-off quantity is compensated for by a corresponding lengthening of the injection period, for which purpose the effective displacement during a stroke of the pump plunger required for the injection is increased. The fact that an improvement of the quiet running is striven for particularly at lower engine speeds conflicts with this type of time-oriented control. In this instance however, the control of fuel quantity for maintaining speed is effected by using the engine speed as a control variable for determining the injection period, while the control throttle cross-section is determined by a presetting parameter corresponding to a predetermined quiet running effect. Thus, in this known fuel injection system, this "interference" with the fuel injection law effected by the adjustable throttle, the fuel injection law, per se, being controlled by the magnetic valve and determined by the electronic control device, is eliminated by changing the closing and opening times, respectively, of the magnetic valve by the electronic control device, so that the different flow-off quantity (interference variable) effected by the adjustable throttle depending on the throttle position, is compensated for. To this extent, this is a matter of a fuel quantity control with the speed as a control variable. However, such a control has the disadvantage that it is relatively sluggish, since the injection quantity is first changed by comparison of actual and desired values in the electronic control device before an additional correction is made possible by a new measurement. But actually this is only a matter of the "interference variable quantity" flowing off via the relief ducts which is to be compensated for.

Of course, it would also be possible to obtain the return flow quantity from the respective regulating variable of the servomotor actuating the adjustable throttle. However, in such compensation claculation, which is effected on the basis of response variables of the servomotor and is carried out in the electronic control device, complicated mathematical functions are involved, since the regulating distance of the servomotor has a correspondingly complicated relation to the return flow quantity flowing through the throttle, which return flow quantity would actually have to be calculated. This is a matter of functions of a higher degree, since pressure changes also occur because of the change in the throttle cross section and in connection with the dynamic relations during the injection processes.

This problem is solved in part in another known injection system (DE-PS 31 47 467) in that a magnetic valve is arranged tn two relief ducts in each instance, and a constant throttle is provided upstream of one magnetic valve, but with the restriction that this is a matter of relief ducts of the injection nozzle itself. The drawback of such a device with an electronic control system consists in that a separate arrangement is required for each injection nozzle, wherein, of course, as a result of the constant throttling during the interference quantity compensation, only the quadratic function between pressure and quantity of a throttling flow need be processed by the electronic control device. In order to be able to work with such a control, however, the start of injection must then be measured at every injection nozzle by an extra sensor, which results in additional expenditure and complication of the system.

Naturally, typical injection control processes not mentioned here are also burdened by these complicated regulating processes, such as that of the adjustment of the start of injection adapted to speed and load or the approximation of the injection quantity which, in particular, is a function of the speed and load.

SUMMARY OF THE INVENTION

The object of the present invention is to provide a fuel injection system in which a continuously constant delivery quantity per cycle of the high-pressure pump in connection with the changing speed and corresponding to it time is a simple characteristic value which is used by the electronic control device. The object is achieved by providing a control throttle with a constant cross-section. Because of the constant cross section of the control throttle the relation between the differential pressure generated by the throttle and the return-flow quantity flowing through this throttle is only a quadratic function which can be handled in a favorable manner by the electronic computer of the control device, so that when the pressure is determined, the return-flow quantity is also determined directly; that is, a quantity value which is in turn equal to the "interference quantity", directly corresponds to the determined value of the pressure.

In addition, the use of an open/close control element in the second relief duct has the advantage, in terms of control technology, that the control throttle is only switched on "at a given time" as interference variable, wherein this time value is directly comparable in the electronic control device with the time interval determined by closing and opening times of the first relief duct by the open/close control device located in the latter. Moreover, since a series of other characteristic values is to be processed in an electronic control device, e.g. temperature, the injection quantity can be determined and the speed can be regulated, respectively, in an exact manner with simple means in the fuel injection system, according to the invention, as a result of a linearization of the functions and, above all, the comparability of the control variables.

Indeed, it is known (GB-OS 21 41 787) to control the beginning and end of delivery of a fuel injection pump via a magnetic valve, wherein the return flow quantity is detected by a deflecting element which is effected by it and, by the actuation of this measuring element, only the start and end of the return flow, and accordingly the start and end of delivery, are measured. Because of the absence of a constant throttle and a measuring element detecting the differential pressure at this throttle, the present instance concerns only a flow measuring device—that is, not a quantity measuring device—not to mention the fact that the present case concerns the general control of an injection pump, rather than a fuel injection pump with a switching on of interference variables.

According to an advantageous construction of the invention, the open/close control element arranged in the second relief duct is a magnetic valve or a valve controlled by a piezoceramic element. Naturally, another kind of electrically actuated valve can also serve as an open/close control valve, wherein it is only important that the high fuel pressures caused by the injection pump can be kept under control and that it be possible to effect the control by means of the electronic control device.

According to another advantageous construction of the invention, the open/close control device arranged in the first relief duct is also actuated by electrical means and controlled by the electronic control device. This open/close control device can also preferably be constructed in this instance as a magnetic valve or as a valve having piezoceramic drive. However, in every case, the actual determination of the fuel quantity is effected via this open/close control device, which is arranged in the first relief duct, this determination of the fuel quantity being corrected, according to the invention, when an "interference quantity" flows off via the second relief duct and must be compensated for. Since the delivery law of the fuel injection pump, namely quantity per time, is fixed, this correction can only be effected by changing the injection period, that is, the time.

According to another advantageous construction of the invention, the electronic control device comprises a module for calculating the differential quantities and for corresponding correction of the injection period, the open/close control unit in the first relief duct being controllable by this module. The differential quantity is precalculated from the pump delivery quantity minus return flow quantity, wherein the measured return flow quantity is fed in and compared with the constant determined pump delivery quantity. The actual injection quantity is obtained from the pump delivery quantity minus the return flow quantity by integration. Parallel to this, the beginning and end of injection for a required injection quantity is calculated at a given time by the electronic control device and fed to the open/close control device and the open/close control element, respectively, after differentiation.

According to another advantageous construction of the invention, the "interference variables" which are fed into the open/close control element are processed in the electronic control device by the differential quantity module for the control times of the open/close device. Thus, it can be achieved in a simple manner that during the switching off of the control throttle the additional return flow quantity accordingly obtained is compensated for in the form of the opening time of the open/close control device, so that the desired injection quantity is actually injected.

According to another embodiment of the invention, the return flow quantities caused by the open/close control device are likewise measured. The actual effective injection quantity is accordingly obtained from the total delivery volume of the injection pump minus the "interference quantity" and minus the quantity flowing through the open/close control device. A refinement of the control can be achieved by this additional quantity measurement, wherein the first and second relief ducts can be connected with one another downstream of the valves and upstream of the quantity measuring location, since the return flow quantity only comes out of the first or second relief duct in each instance.

According to another construction of the invention, the control throttle serves as a differential pressure transmitter of a quantity measuring device, in which the pressure differential effects a corresponding regulated value which is fed to the electronic control device via a distance transmitter or displacement pickup which accordingly works in a quantity-analog manner. Various constructions are also possible in this instance, wherein particularly pressure/distance converters in which the function between pressure differential and fuel quantity, which function is quadratic per se, corresponds to a piston travel/spring force are used. In such a pressure measuring device working with a quadratic function, in which e.g. a piston which is acted upon by pressure works against a spring. In a relief duct containing such a constant throttle, the quadratic degrees of the function connecting pressure and quantity are eliminated, so that an assigned distance transmitter of the pressure measuring device can supply the electronic control device with a measured value which is linearly proportional to the return flow quantity. In this instance, as well, the construction can differ, namely either a piston is moved against a spring or a diaphragm is moved against a spring, wherein the throttle opening can be arranged in the diaphragm.

The present invention as to its construction so to its mode of operation, together with additional objects and advantages thereof, will be best understood from the following description of the preferred embodiments with reference to the appended drawings.

DESCRIPTION OF THE PREFERRED EMBODIMENTS

Figure 1:
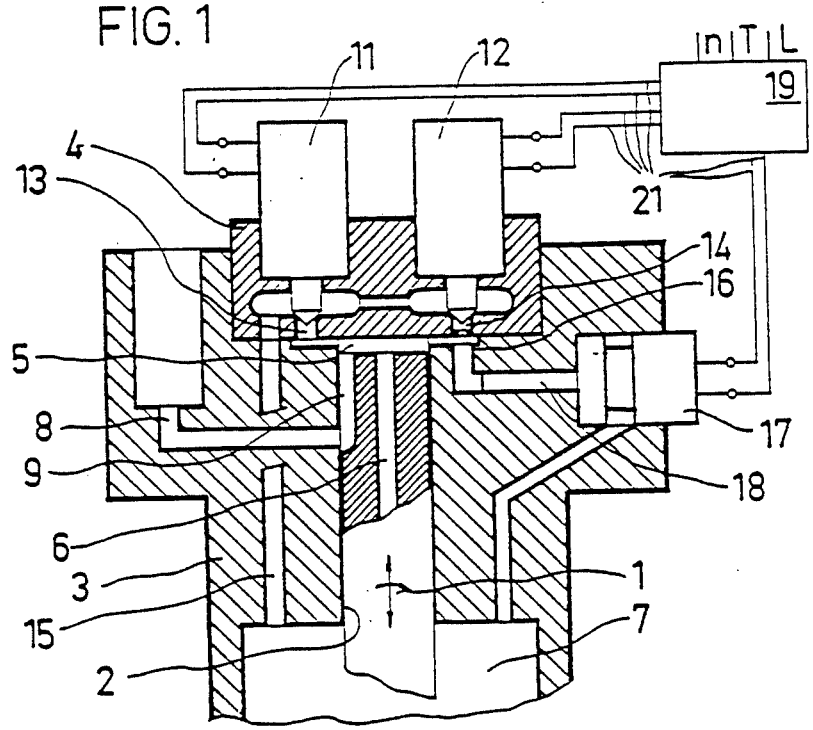
FIG. 1 shows a vertical longitudinal partial cross-sectional view of a first embodiment of a fuel injection pump according to the invention.

FIG. 1 shows a distributor injection pump used as an injection pump and comprising a pump plunger 1 which executes a reciprocates and rotates under an action of means which are not shown. The pump plunger 1 operates in a bore 2 of a pump housing 3 and in the latter defines a pump work space 5 with the bore 2 and a housing head 4.

The pump plunger 1, has a central suction bore 6 which opens into a pump suction space 7 in the housing 3 at the lower dead center of the pump plunger 1 at the latest, so that the pump work space 5 can be filled with fuel from the pump suction space 7. The pump suction space 7 is supplied with fuel at a lower pressure by a delivery pump, not shown. The control of the suction bore 6 toward the suction space 7 is not shown.

In the housing 3, there are provided pressure ducts 8 in accordance with the number of cylinders of the internal combustion engine to be supplied, which pressure ducts 8 are uniformly distributed around the bore 2, only one of them being shown in the drawing. Pressure lines, not shown, lead from the pressure ducts 8 to the individual internal combustion cylinders. A distributor longitudinal groove 9 is arranged in the outer surface area of the pump plunger 1 and connects one of the pressure ducts 8 with the pump work space 5 during the compression stroke and the continued rotation, whereas, during the suction stroke of the pump plunger 1, these pressure ducts are separated from the distributor longitudinal groove 9.

The pump work space 5 is thus completely filled with fuel prior to the beginning of every compression stroke and always changes by the same total volume at every compression stroke, so that the fuel quantity displaced from the pump work space 5 is exactly identical during every stroke.

Two magnetic valves 11 and 12 are arranged in the housing head 4, the magnetic valve 11 controlling a first relief duct 13 of the pump work space 5 as an open/close control device and the magnetic valve 12 controlling a second relief duct 14 as an open/close control element. The two relief ducts 13 and 14 communicate with a duct 15 which opens into the suction space 7. When at least one of the magnetic valves 11 or 12 opens during the compression stroke of the pump plunger 1, fuel flows into the suction space 7 from the pump work space 5 so that the fuel quantity delivered to the engine via the distributor longitudinal groove 9 and the duct 8 is correspondingly reduced. The magnetic valve 11 determines the start and end of an injection by its opening period. It closes for the start of the injection after the beginning of the compression stroke of the pump plunger 1 and opens again for the end of delivery after injection of a determined fuel quantity. This quantity can be determined in a simple manner by the electronic control device, not shown in this Figure, which controls the magnetic valves 11 and 12, namely from the actual opening period in connection with the constant delivery volume of the pump plunger 1. In this simplified view, the description of otherwise conventional safety controls and the like, which determine the latest end of the delivery, are omitted. Of course, another member controlling the injection quantity can also be used, according to the invention, instead of this magnetic valve 11, e.g., annular slides which are conventionally arranged on the pump plunger valve in distributor pumps.

A throttle 16 having a constant cross section is arranged in the second relief duct 14 so that the fuel quantity controlled by the magnetic valve 12 must constantly flow through this throttle 16. This fuel quantity, which is controlled by the magnetic valve 12 and called the interference quantity in the introductory part of the specification, is referred to below as a control quantity, since the quantity delivered to the pump plunger 1 per time unit for the internal combustion engine is either reduced or entirely interrupted by this control process of the magnetic valve 12, that is, it has a controlling influence on the injection law. This control quantity must be compensated for in every case by a corresponding quantity delivered to the internal combustion engine by controlling the closing period of the magnetic valve 11 in order to be able to maintain the desired engine speed. By continuously allowing a partial quantity to flow through the second relief duct 14, a lengthening of the injection period is accordingly achieved which leads in particular to a softer running of the internal combustion engine, and a so-called "pre-injection", as desired in many direct injection engines for improving ignition, can be achieved by an interruption of the injection after the start of infection by controlling opening of the second relief duct.

The drop in pressure in the second relief duct 14 caused by the throttle 16 is determined by a pressure measuring device 17 which cooperates with a spring-loaded measuring piston 18, wherein the distance covered by the latter corresponds to a corresponding pressure differential between the pressure in the pump work space 5 and the pressure in the suction space 7. The fuel quantity flowing through the throttle 16 when the magnetic valve 12 is opened depends on the throttle cross-section and on the pressure differential, so that the fuel quantity flowing through the throttle 16 per time unit corresponds to the differential pressure based on this function. The electronic control device 19, which is connected with the magnetic valves 11 and 12 and the pressure measuring device 17 by corresponding lines 21, receives the characteristic values such as engine speed, which also corresponds to the pump plunger speed (displacement per time unit), as well as the differential pressure at the throttle 16 and calculates the control quantity in order to calculate the control times of the magnetic valve 11 accordingly. The program of the electronic control device 19 naturally contains the function between engine speed, load and injection quantity required for regulating the speed, wherein the load is usually determined by the position of the accelerator pedal. Moreover, the temperature of the internal combustion engine is also input. The corresponding connection lines to the electronic control device 19 are correspondingly designated by n (speed), T (temperature) and L (load).

Figure 2:
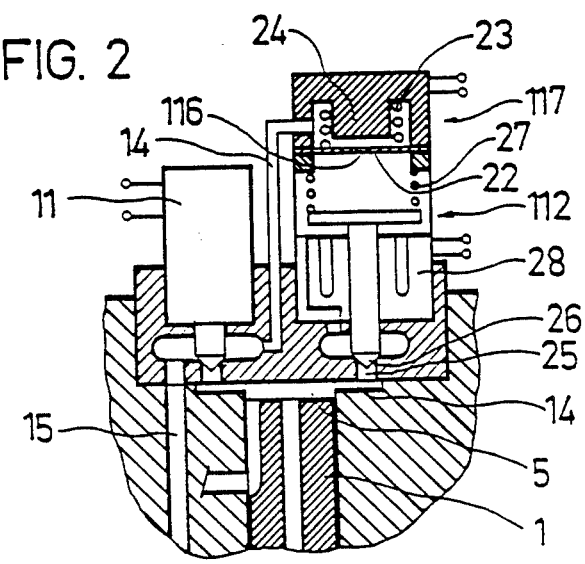
FIG. 2 shows a vertical longitudinal partial cross-sectional view of a second embodiment of a fuel injection pump according to the invention with a different location of the pressure measuring device.

A second embodiment for implementing the principle of lengthening the injection period according to the invention is shown in FIG. 2. In this embodiment, the pressure measuring device 117 is arranged downstream of the magnetic valve 112 and is integrated in its housing. The pressure measuring device 117 cooperates in this instance with a diaphragm 22, as a pressure transmitter, which is loaded by a spring 23 and is arranged opposite a magnet core 24 for measuring the distance between the diaphragm and the magnet core. The constant throttle 116 is in the diaphragm 22, wherein the deflection of the diaphragm 22 is determined by a pressure drop of the pressure upstream and downstream of this diaphragm. The pressure drop depends on the throttle cross-section and on the quantity flowing through. This quantity can be, at maximum, the delivery quantity of the pump plunger 1. In such a case, of course, the injection would be interrupted. In order to avoid this—a lengthening of the injection period is to be effected an interruption—the magnetic valve 112 is arranged upstream of this throttle 116 and causes a throttle effect in its passage 25 in connection with the valve cross-section 26 and the closing spring 27, which throttle effect in the desired speed range—usually soft running—allows only enough of a quantity to flow off so that the delivery quantity of the pump plunger 1 usually injected allows the desired speed to be maintained. This throttle effect can be easily adjusted. The defferential pressure-dependent quantity measurement, on the other hand, operates independently of it. Only low speeds are then critical, since the throttle effect at the magnetic valve 112 must always be great enough so that the pressure necessary for controlling the injection valve can form in the pump work space 5. At high speeds, on the other hand, the soft running effect hardly takes effect, since only very small quantities can also flow off in the relatively brief time available because of the throttle effect which is now very great. Of course, in order to change the throttle effect of the second magnetic valve the latter can be provided with a changeable magnetic closing force. The quantity measuring function of this control quantity which flows off is not burdened by such a control effect in this embodiment, which has great importance for the actual speed regulation by maintaining the total fuel quantity to be injected per cycle. The electronic control device accordingly regulates the speed by changing the opening time of the magnetic valve 11, wherein, by this delay, a fuel quantity is injected which corresponds to the control quantity flowing back through the magnetic valve 112 and which has been measured by the pressure measuring device 117. If the throttle effect of the magnetic valve 112 is now changed by means of intervention at the magnetic valve 112, this does not otherwise effect the regulating function, since the required injection quantity, which is determined in part from the control quantity flowing through the throttle 16, serves as a control variable.

In this variant, the magnetic valve 112 is closed in a currentless state accompanied by loading with the closing spring 27, but would open at pressures which are already low and during failures of the current supply, so that a racing of the engine caused by continued injection would not be possible. The magnet 28 of this magnetic valve reinforces this force depending on the intensity of the excitation, so that it would open the magnetic valve 112 after switching off the magnet 28 of the magnetic valve 112 due to the high pressure of the fuel.

Figure 3:
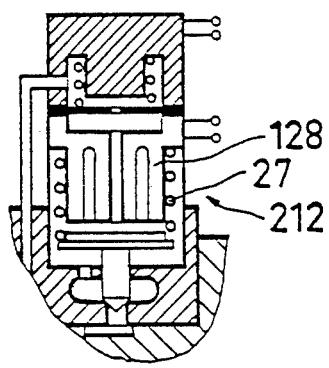
FIG. 3 shows a vertical longitudinal partial cross-sectional view of a third embodiment of a fuel injection pump according to the invention.

In the variant in FIG. 3, which is constructed in principle in the same manner as that in FIG. 2, the action of the magnet 128 is only reversed. The closing spring 27 also causes a currentless closing of the magnetic valve 112 in this embodiment. When switching on the magnet 128, the force of the closing spring 27 is reduced or eliminated entirely corresponding to the magnetic force. This construction corresponds to the conventional magnetic valve, the closing spring force acting against the magnet force when the magnetic valve is controlled.

Figure 4:
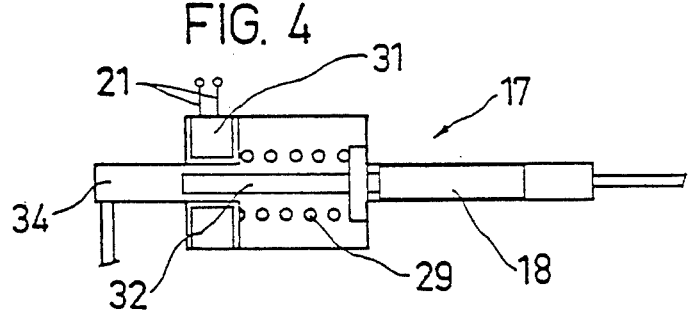
FIGS. 4 and 5 show two different embodiments of a flow meter.
Figure 5:
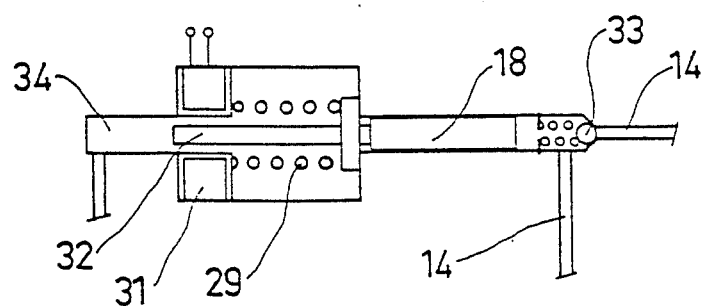

The pressure measuring device 17 the cross-section of which is shown in FIG. 4, corresponds to the pressure measuring device as shown in FIG. 1. The measuring piston 18 is loaded by a measuring spring 29 and comprises an armature 32 projecting into a measuring coil 31. The position of the measruing piston 18 and the armature 31 can accordingly secure the measuring coil 31 and be transmitted to the electronic control device via the electric connection lines. The cross-sectional area of the measuring piston 18 and the force and characteristic line of the measuring spring 29 are decisive for the pressure-dependent adjustment of the armature 32. Since the quantity flow law at a throttle of a predetermined cross section follows a quadratic function, it can be achieved, with a corresponding characteristic line of the measuring spring 29, that pressure changes, namely when the control quantity is allowed to flow off through the throttle 16 (FIG. 1), correspond to the displacement distance 32 of the armature and directly corresponds to the quantity flowing off, so that a measured value for the quantity flowing off is directly available by measuring the travel of the armature 32. A variant of the pressure measuring device 117 shown in FIG. 2 is shown in FIG. 5. Also, in this instance, fuel flows through the pressure measuring device or quantity measuring device which is inserted in the second relief duct 14. A check valve 33 only serves for decoupling. Moreover, this pressure measuring device is constructed with a measuring piston 18, the measuring spring 29, the measuring coil 31, and the armature 32 exactly as in FIG. 4. The pressure in the space 34 receiving the armature 32 is balanced with respect to pressure in the suction space 7 in the two constructions.

Figure 6:
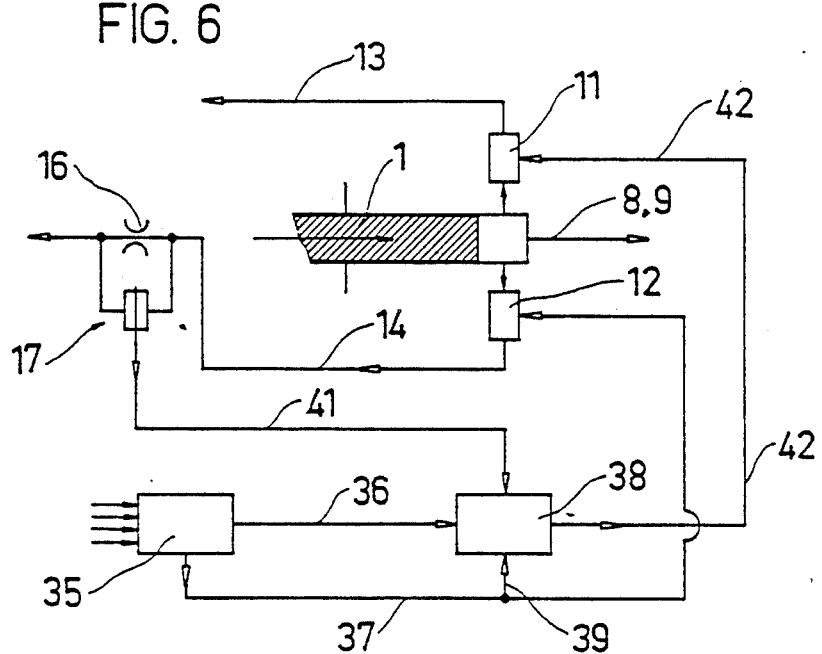
FIG. 6 shows a wiring diagram for one of the embodiments with an electronic control device.

The wiring diagram in FIG. 6 corresponds in principle to the injection system shown in FIG. 1.

The electronic control device shown in this wiring diagram has two blocks. The actual controller block 35, in whose computer the individual engine characteristic values such as speed, load, etc. are processed by a program, controls with an output 36 the magnetic valve 11 determining the beginning and end of injection, and via an output 37 the second magnetic valve 12, by which the control quantity can be determined. The end of injection, which is determined by the magnetic valve 11, must be delayed, according to the invention, until the "interference quantity" controlled by the magnetic valve 12, has been replaced. However, the total duration of injection, including the delayed end of injection, must constantly be possible during the compression stroke of the pump plunger 1.

In order to determine the time interval by which the magnetic valve 11 opens for ending the fuel injection later than would be the case if no fuel quantity flowed back through the magnetic valve 12, a differential quantity module 38 is connected downstream of the controller block 35; the output 36 communicates with differential quantity module 38, and the control signals are fed to the differential quantity module 38 from the output 37 via a connection 39 and, above all, the measured values from the control quantities determined from the throttle 16 and pressure measuring device 17 are processed in the differential quantity module 38. They are supplied to the differential quantity module 38 via a line 41. A control line 42 leads from this module to the first magnetic valve 11. When the control time of opening of the magnetic valve 12 changes because of a demand of the program in the controller block 35 and the control quantity, which flows via the second relief duct 14 and, above all, the throttle 16, also changes accordingly, a characteristic value is determined by the pressuring measuring device 17 as a result of the aforementioned processes, which characteristic value corresponds to the return flow quantity and is fed to the differential quantity module 38 via the line 41. The latter, in turn, causes a corresponding change of the control time of the magnetic valve 11 because of the program fed to it and in recognition—via the connection 39—of the control time change of the magnetic valve 12.

Figure 7:
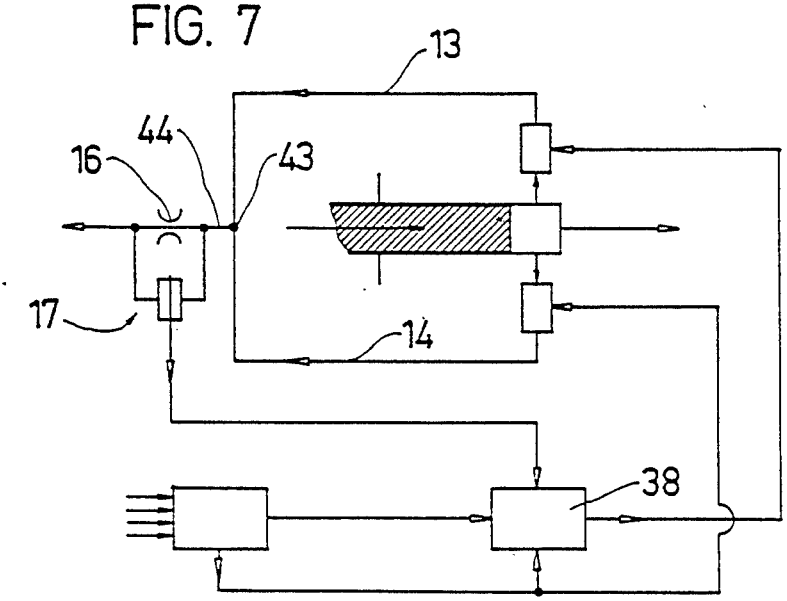
FIG. 7 shows a variant of this wiring diagram.

A second wiring diagram, in which a differential quantity module 38 performs the same function as in the previous embodiment, is shown in FIG. 7. In contrast, however, also with respect to everything described above, the two relief ducts 13 and 14 are connected with one another at 43 before the fuel quantities flowing back are guided away via a common duct 44, in which the throttle 16 and the pressure measuring device 17 are arranged. As in the embodiment shown in FIG. 6, the differential quantity module 38 can also be switched off in this instance, so that the speed of the internal combustioon engine is only controlled via the controller block 35 of the electronic control device.

While the invention has been illustrated and described with reference to specific embodiments of a fuel injection system for internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fuel injection system for an internal combustion engine, said fuel injection system comprising:
   a high-pressure pump including pump work space and means for delivering a constant fuel quantity per a pump cycle from said pump work space;
   a first relief duct for returning a first return flow quantity;
   first open/close control means for controlling the first flow quantity flowing through said first relief duct to thereby determine a start and an end of the delivery;
   a second relief duct for returning a second return flow quantity and including a control throttle; and
   electronic control means for controlling the fuel delivery in accordance with characteristic values of the internal combustion engine and said high-pressure delivery pump;
   said control throttle having a constant cross-section, said fuel injection system further comprising quantity measuring means located in said second relief duct for measuring the second return flow quantity and a second open/close control means for controlling the second return flow quantity, said electronic control means comprising means for controlling the flow delivery in accordance with characteristic values of said quantity measuring means and said second open/close control means and in accordance with the constant fuel delivery quantity also used as a characteristic value.

2. A fuel injection system according to claim 1 wherein said pressure measuring means and said second open/close control means each has electrical operating means.

3. A fuel injection system according to claim 2 wherein said second open/close control means is formed as a second valve comprising a second movable valve member, and also a second spring and second actuating means for controlling displacement of said second movable valve member.

4. A fuel injection system according to claim 3 wherein said first open/close control means is formed as a first valve comprising an first movable valve member, and also a first spring and first actuating means for controlling displacement of said first movable valve member.

5. A fuel injection system according to claim 4 wherein each of said first and second valves is formed as one of seat and spool vlaves, and each of said first and second actuating means comprises one of electromagnetic and piezoceramic means.

6. A fuel injection system according to claim 3 wherein said control throttle and said open/close control means are arranged one after the other, said fuel injection system comprising a vlave passage located upstream of said throttle and cooperating with said second valve member to form a throttling orifice for uncoupling said control throttle.

7. A fuel injection system according to claim 2 wherein said electronic control means is formed to compensate for fuel quantity flowing through said second open/close control means in accordance with lengthening of an injection period by said first open/close control means.

8. A fuel injection system according to claim 7 wherein said electronic control means comprising a module for determining a differential quantity which is equal to the predetermined delivery quantity minus a control quantity and for controlling a closing time and thereby an injection period of said first open/close control means in accordance with the determined differential quantity.

9. A fuel injection system according to claim 8 wherein said electronic control means is formed to control said first open/close control means in accordance with a fuel quantity flowing through said first open/close control means.

10. A fuel injection system according to claim 9 wherein said quantity measuring means is formed to measure the first return flow quantity, said first and second relief ducts merging upstream of said quantity measuring device.

11. A fuel injection system according to claim 2 wherein said quantity measuring means and said control throttle form a differential pressure sensor, said fuel injection system including movable means displaceable a distance corresponding to a pressure differential across said control throttle and a displacement quantity analog transmitter for measuring said distance and communicating it to said electronic control means.

12. A fuel injection system according to claim 11 wherein said movable means comprises a piston.

13. A fuel injection system according to claim 11 wherein said movable means comprises a diaphragm having an initial position and means for biasing said diaphragm to the initial position thereof.

14. A fuel injection system accoding to claim 13 wherein said control throttle is located in sqaid diaphragm.

* * * * *